Patented Apr. 6, 1926.

1,579,401

UNITED STATES PATENT OFFICE.

HENRY D. SCHMIDT, OF LAKE ALFRED, FLORIDA, ASSIGNOR OF ONE-FOURTH TO W. F. HUTCHINSON AND ONE-FOURTH TO B. O. CARN, JR., BOTH OF WINTER HAVEN, FLORIDA.

COMPOSITION OF MATTER FOR USE IN TREATING MATCHES.

No Drawing. Application filed October 13, 1925. Serial No. 62,320.

*To all whom it may concern:*

Be it known that I, HENRY D. SCHMIDT, a citizen of the United States, residing at Lake Alfred, in the county of Polk and State of Florida, have invented a new and useful Composition of Matter for Use in Treating Matches, of which the following is a specification.

This invention relates to a composition of matter designed primarily for rendering matches waterproof, one of the objects being to provide a composition into which the head portions of matches can be dipped whereupon they will be left with a thin film or coating of waterproofing material which will prevent injury to the matches from moisture but which will not interfere with the striking or ignition by friction.

With the foregoing and other objects in view the invention consists of the following ingredients substantially in the proportions stated, to wit

|  | Pound. |
|---|---|
| Beeswax | ⅓ |
| Sealing wax | ¼ |
| Rubber cement | ½ |

The foregoing ingredients are subjected to heat so as to melt and mix thoroughly. Thereafter a sufficient amount of gasoline is added to produce a liquid of the consistency of cream. The heads of the matches to be waterproofed are then dipped into this mixture and after being removed will dry quickly, leaving a thin film of protecting material which will exclude moisture but will not interfere with the lighting of the matches by friction.

What is claimed is:

A composition of matter for use in waterproofing matches, including the following ingredients, substantially in the proportions stated, beeswax ⅓ lb., sealing wax ¼ lb., rubber cement ½ lb. and a sufficient amount of gasoline to reduce to a fixed liquid the foregoing ingredients after they have been mixed by heating.

In testimony that I claim the foregoing as my own, I have hereto affixed my signature.

HENRY D. SCHMIDT.